US009772195B2

(12) United States Patent
Lambert et al.

(10) Patent No.: US 9,772,195 B2
(45) Date of Patent: Sep. 26, 2017

(54) DELETING UNNECESSARY MAP DATA

(71) Applicant: Lytx, Inc., San Diego, CA (US)

(72) Inventors: Daniel Lambert, Carlsbad, CA (US); Brendan Peter, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

(21) Appl. No.: 14/977,342

(22) Filed: Dec. 21, 2015

(65) Prior Publication Data
US 2016/0109246 A1  Apr. 21, 2016

Related U.S. Application Data

(63) Continuation of application No. 13/912,812, filed on Jun. 7, 2013, now Pat. No. 9,268,741.

(51) Int. Cl.
G01C 21/32 (2006.01)
G01S 19/01 (2010.01)
G07C 9/00 (2006.01)

(52) U.S. Cl.
CPC .............. G01C 21/32 (2013.01); G01S 19/01 (2013.01); G07C 9/00896 (2013.01); G07C 2009/00976 (2013.01)

(58) Field of Classification Search
CPC ................ G01C 21/32; G07C 9/00896; G07C 2009/00976; G01S 19/01

USPC ..... 701/450, 527, 532, 409, 410; 455/456.1, 455/561, 435.3, 411, 436; 370/342, 329
See application file for complete search history.

(56) References Cited

U.S. PATENT DOCUMENTS

| 5,815,682 | A  | * | 9/1998  | Williams | G06F 9/54 703/25 |
| 8,073,441 | B1 | * | 12/2011 | Unger | H04W 48/18 455/404.2 |
| 2002/0196151 | A1 | * | 12/2002 | Troxler | A01K 15/023 340/573.4 |
| 2006/0122771 | A1 | * | 6/2006 | Mikuriya | G01C 21/32 701/450 |
| 2008/0281485 | A1 | * | 11/2008 | Plante | H04N 5/76 701/33.4 |
| 2011/0176494 | A1 | * | 7/2011 | Huang | G01S 5/02 370/329 |
| 2014/0040881 | A1 | * | 2/2014 | Thorsen | G06F 9/4411 717/177 |

* cited by examiner

Primary Examiner — Marthe Marc-Coleman
(74) Attorney, Agent, or Firm — Van Pelt, Yi & James LLP

(57) ABSTRACT

A system for deleting map data comprises an interface and a processor. The interface is configured to determine a location associated with a device. The processor is configured to determine one or more map bundles to delete based at least in part on the location and delete the one or more map bundles.

24 Claims, 5 Drawing Sheets

DELETING UNNECESSARY MAP DATA

CROSS REFERENCE TO OTHER APPLICATIONS

This application is a continuation of U.S. patent application Ser. No. 13/912,812 issued as U.S. Pat. No. 9,268,741, entitled DELETING UNNECESSARY MAP DATA filed Jun. 7, 2013 which is incorporated herein by reference for all purposes.

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. If an anomalous event is detected, then sensor data related to the event is stored for later review. A vehicle event recorder for cars and trucks (e.g., vehicles that operate on public roads) typically includes road map data comprising location-specific legal information (e.g., speed limit information, stop sign information, traffic light information, yield sign information, etc.). Location-specific legal information can be used to identify an anomalous event in the case of the vehicle acting against the law (e.g., traveling in excess of the speed limit, rolling through a stop sign, etc.). When a vehicle event recorder is installed in a vehicle, it will ideally have only an appropriate set of map data. However, building and shipping a set of different vehicle event recorders each with a different set of map data creates logistical complexity and increases cost of manufacturing.

BRIEF DESCRIPTION OF THE DRAWINGS

Various embodiments of the invention are disclosed in the following detailed description and the accompanying drawings.

DETAILED DESCRIPTION

Figure 1:
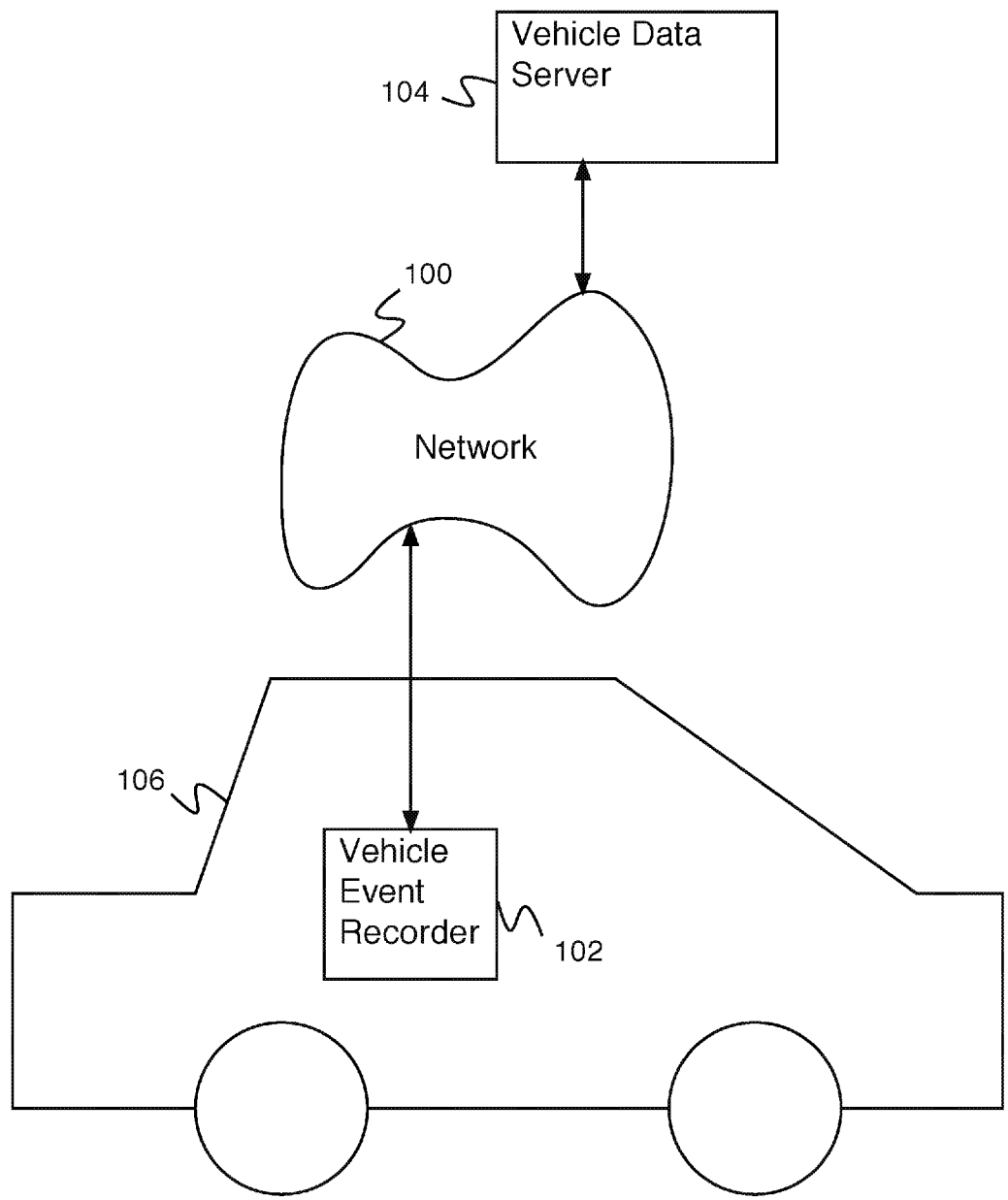
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Deleting unnecessary map data is disclosed. A system for deleting map data comprises an interface configured to determine a location associated with a device, and a processor configured to determine one or more map bundles to delete based at least in part on the location and to delete the one or more map bundles. The system additionally comprises a memory coupled to the processor and configured to provide the processor with instructions.

Rather than creating a set of products—where each of the products in the set of products is nearly identical to the others in the set but with a different set of map data, one product is created—a vehicle event recorder—and is shipped with map data for all locations. In some embodiments, the product comprises a system including a hardware platform, wireless platform and a software system for vehicle event recoding (e.g., a smart phone with event recorder software). When the product is initialized, it determines its location and deletes all unnecessary map data. In various embodiments, the map data is deleted prior to allowing application access to the data, concurrent to an application accessing the data, after an application accesses the data, or any other appropriate timing. In some embodiments, the product registers with a server (e.g., a vehicle data server) to initiate operations. In some embodiments, removing the unnecessary map data is required to avoid paying unnecessary license fees to a map supplier—for example, the map supplier charges fees based on the specific maps used by the product so it costs more to include maps of regions that will not be used. Also, removing unnecessary map data frees memory space on the product for vehicle event data.

In some embodiments, the product location (e.g., the vehicle event recorder location) is determined using the communications system that is detected (e.g., the signal type received, the communication protocol allowed to be activated or provisioned, the on-board hardware, etc.). In some embodiments, the location is determined by using the communications system protocol (e.g., if the Code Division Multiple Accessing (CDMA) communications protocol is only used by the product in the US and Canada, so if a CDMA communications system is detected, the location is set to be US and/or Canada). In some embodiments, the location is determined using the communications system registration information (e.g., a Global System for Mobile (GSM) Communications includes a country code as part of its subscriber identity module (SIM), so if a GSM communications system is detected, the location can be determined by reading the country code from the subscriber identity module (SIM); or for example, a removable user identity module (R-UIM) associated with a CDMA system, a system identification number (SID) associated with a carrier, or an embedded stored identifier). In some embodiments, the location is determined by using a vehicle event recorder global positioning system (GPS).

FIG. 1 is a block diagram illustrating an embodiment of a system including a vehicle event recorder. Vehicle event recorder 102 comprises a vehicle event recorder mounted in a vehicle (e.g., a car or truck). In some embodiments, vehicle event recorder 102 includes or is in communication with a set of sensors—for example, video recorders, audio recorders, accelerometers, gyroscopes, vehicle state sensors, GPS, outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle event recorder 102 comprises a system for processing sensor data and detecting events. In some embodiments, vehicle event recorder 102 comprises map data. In some embodiments, vehicle event recorder 102 comprises a system for detecting behaviors of interest (e.g., indicators of riskiness and efficiency). In some embodiments, vehicle event recorder 102 comprises a system for deleting unnecessary map data. In various embodiments, vehicle event recorder 102 is mounted to vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a CDMA network, a GSM network, a local area network, a wide area network, the Internet, or any other appropriate network. Vehicle event recorder 102 communicates with vehicle data server 104 via network 100. Vehicle event recorder 102 is mounted on vehicle 106. In various embodiments, vehicle 106 comprises a car, a truck, a commercial vehicle, a train, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In some embodiments, events recorded by vehicle event recorder 102 are downloaded to vehicle data server 104 when vehicle 106 arrives at the home station. In some embodiments, vehicle data server 104 is located at a remote location.

Figure 2:
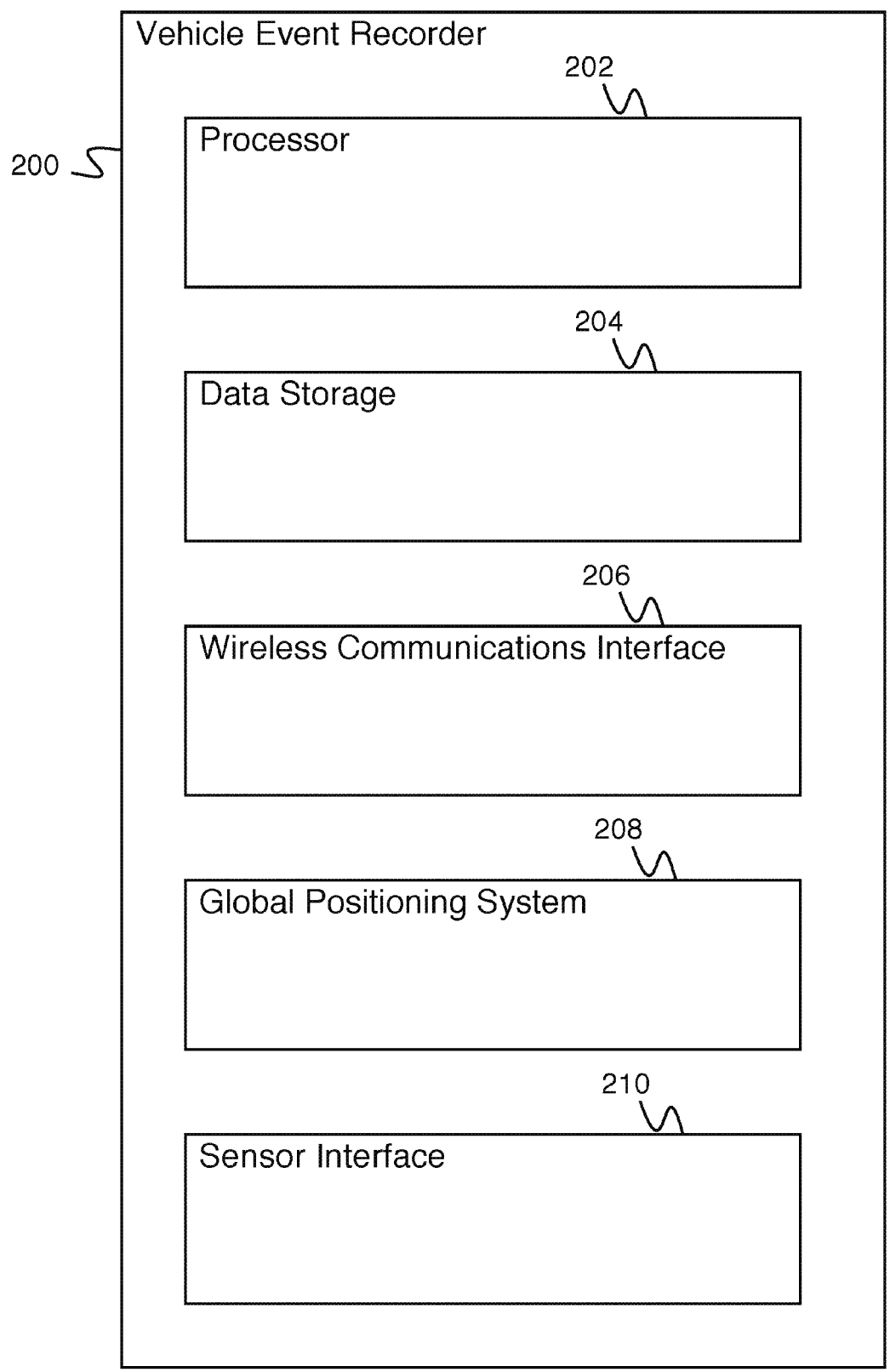
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises processor 202. Processor 202 comprises a processor for controlling the operations of vehicle event recorder 200, for reading and writing information on data storage 204, for communicating via wireless communications interface 206, for determining a position using global positioning system 208, and for reading data via sensor interface 210. Data storage 204 comprises a data storage (e.g., a random access memory (RAM), a read only memory (ROM), a nonvolatile memory, a flash memory, a hard disk, or any other appropriate data storage). In various embodiments, data storage 204 comprises a data storage for storing instructions for processor 202, vehicle event recorder data, map data, or any other appropriate data. In some embodiments, data storage 204 comprises a set of map bundles. In some embodiments, a map bundle comprises a set of map data specific to a region (e.g., US/Canada, Western Europe, China, Australia/New Zealand, etc.). In some embodiments, a map bundle includes a data version identifier. In various embodiments, a data version identifier comprises one or more of the following: a vendor identifier, a product identifier, a version identifier, a region identifier, or any other appropriate identifier. Wireless communications interface 206 comprises a wireless communications interface for communicating over a network (e.g., over network 100 of FIG. 1). In various embodiments, wireless communications interface 206 comprises one or more of a GSM interface, a CDMA interface, an integrated digital enhanced network (iDEN), a universal mobile telecommunications system (UMTS) interface, a long term evolution (LTE) interface, a WiFi™ interface, a worldwide interoperability for microwave access (WiMax) interface, a wired or wireless interface with SIM card functions, or any other appropriate interface. Global positioning system 208 comprises a global positioning system (e.g., GPS) for determining a system location. Sensor interface 210 comprises an interface to one or more vehicle event recorder sensors. In various embodiments, vehicle event recorder sensors comprise an accelerometer, a gyroscope, a camera, a microphone, an outdoor temperature sensor, a moisture sensor, a laser line tracker sensor, vehicle state sensors, or any other appropriate sensors. In various embodiments, vehicle state sensors comprise a speedometer, an accelerator pedal sensor, a brake pedal sensor, an engine RPM sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, sensor interface 210 comprises an on-board diagnostics (OBD) bus. In some embodiments, vehicle event recorder 200 communicates with vehicle state sensors via OBD bus.

Figure 3:
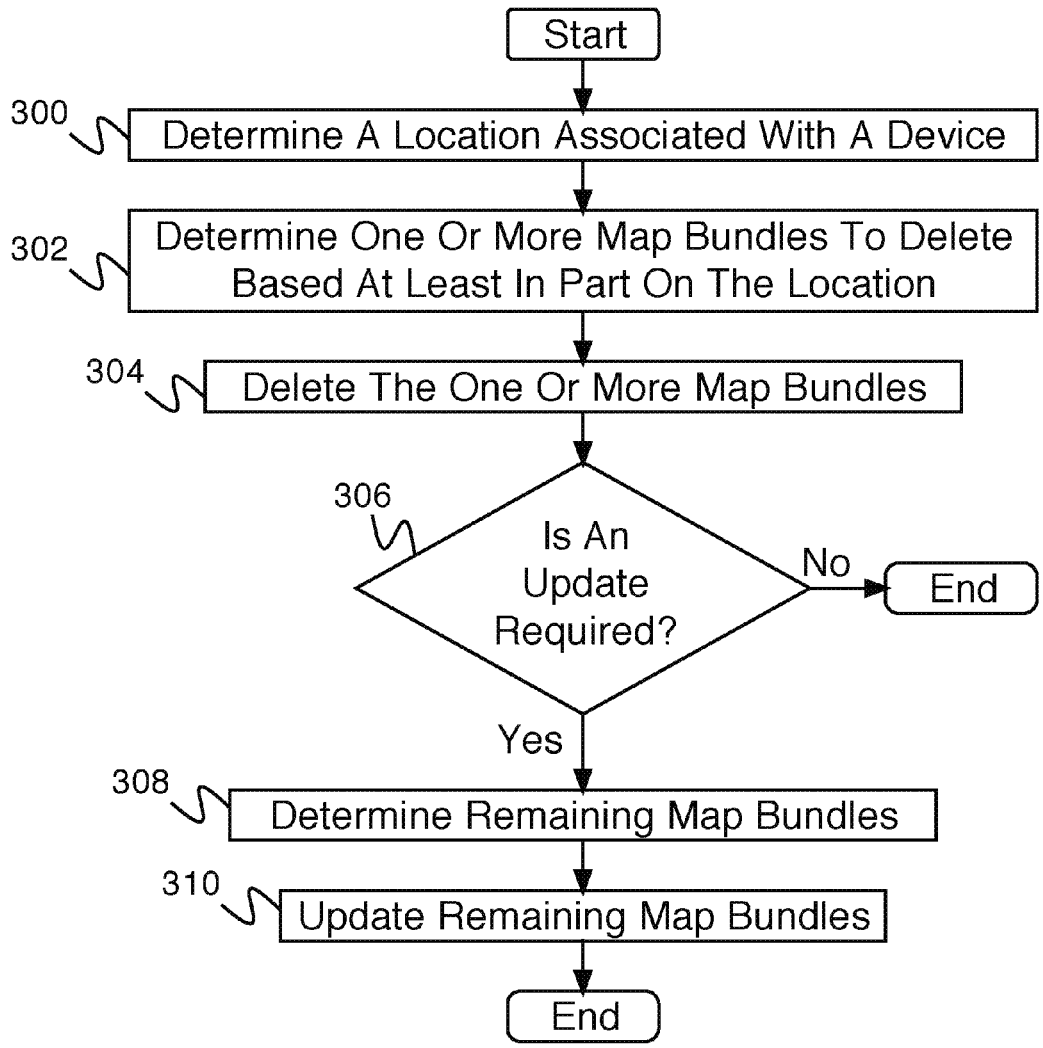
FIG. 3 is a flow diagram illustrating an embodiment of a process for deleting unnecessary map data.

FIG. 3 is a flow diagram illustrating an embodiment of a process for deleting unnecessary map data. In some embodiments, the process of FIG. 3 is executed by vehicle event recorder 200 of FIG. 2. In some embodiments, the vehicle event recorder is pre-loaded with one or more map bundles. In some embodiments, the one or more map bundles are stored in a data storage. In the example shown, in 300, a location associated with the device is determined. In some embodiments, the location is determined using a wireless communications interface. In 302, one or more map bundles to delete are determined based at least in part on the location. In some embodiments, the one or more map bundles to delete comprise map bundles not associated with the location (e.g., map bundles comprising map data not including the location). In some embodiments, the one or more map bundles to delete are determined by a processor. In 304, the one or more map bundles are deleted. In some embodiments, the memory storing the one or more map bundles is freed for other use or for general use. In 306, it is determined whether an update is required. In some embodiments, an update is required if there is a more recent version of a map bundle than the one stored by the vehicle event recorder. In some embodiments, an update is required at regular intervals (e.g., once a week, once a month, once every six months, etc.). If it is determined that an update is not required, the process ends. If it is determined that an update is required, control passes to 308. In 308, the remaining map bundles are determined. In some embodiments, the remaining map bundles comprise the map bundles not deleted in 304. In 310, the remaining map bundles are updated. In some embodiments, updating the remaining map bundles comprises downloading new versions of the remaining map bundles (e.g., using a wireless communications interface) and replacing the stored versions of the map bundles with the new versions of the map bundles.

Figure 4:
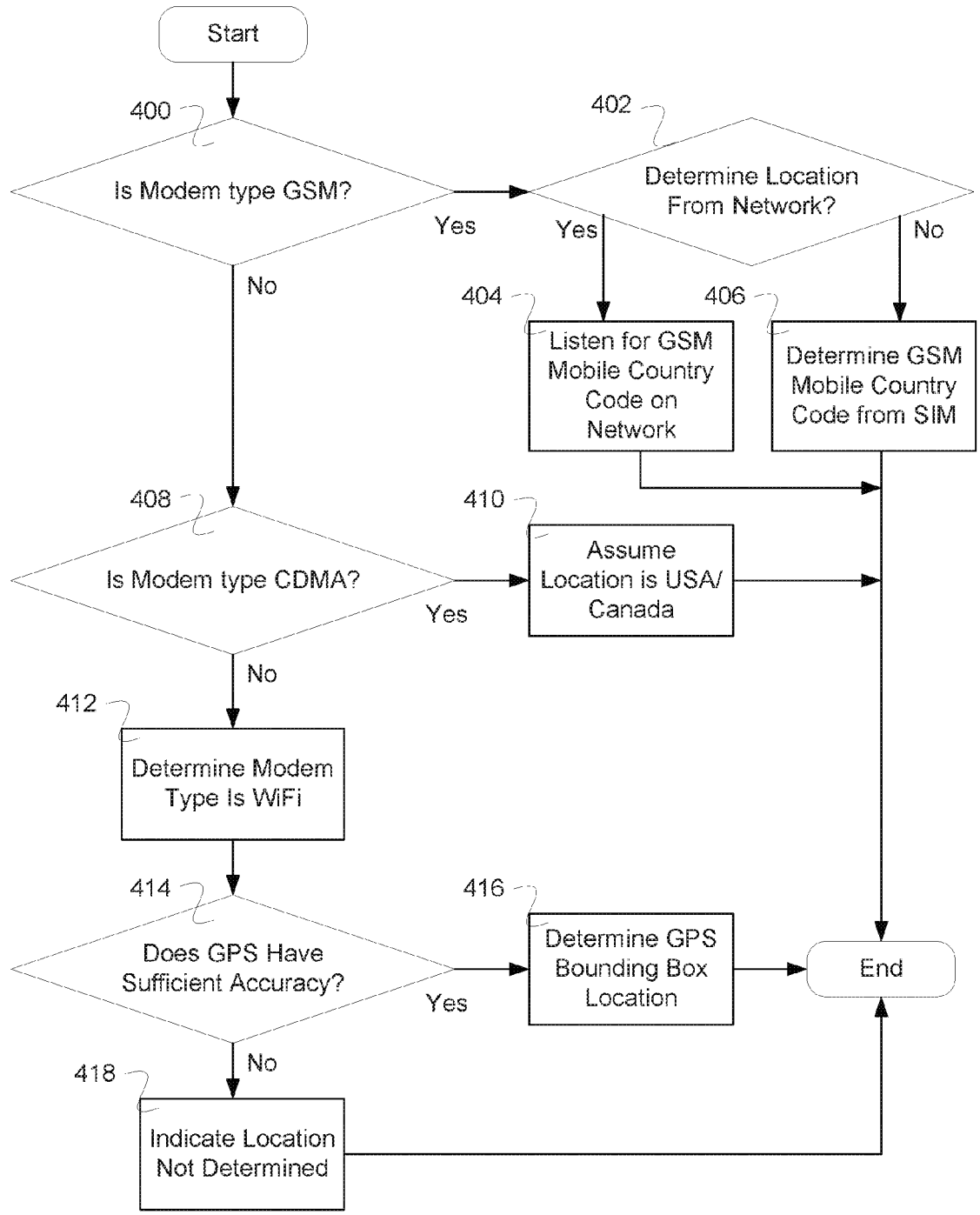
FIG. 4 is a flow diagram illustrating an embodiment of a process for determining a location associated with a device.

FIG. 4 is a flow diagram illustrating an embodiment of a process for determining a location associated with a device. In some embodiments, the process of FIG. 4 implements 300 of FIG. 3. In the example shown, in 400, it is determined whether the modem type is GSM. In some embodiments, the modem can be queried directly to determine its type. If it is determined that the modem type is GSM, control passes to 402. In 402, it is determined whether to determine the location from the network. In some embodiments, using a GSM network, the mobile country code can be determined either by listening to network traffic or by querying the subscriber information module (SIM). If it is determined to determine the location from the network, control passes to 404. In 404, the system listens for the GSM mobile country code on the network. When the system has determined the mobile country code, the location is known. If it is determined in 402 not to determine the location from the network, control passes to 406. In 406, the GSM mobile country code is determined directly from the SIM (e.g., by querying the SIM for the associated mobile country code).

If it is determined in 400 that the modem type is not GSM, control passes to 408. In 408, it is determined whether the modem type is CDMA. If it is determined that the modem type is CDMA, control passes to 410. In 410, the location is assumed to be USA/Canada. CDMA is currently not used outside of the USA or Canada, so no other locations are possible. If it is determined in 408 that the modem type is not CDMA, control passes to 412. In 412, it is determined that the modem type is WiFi. No other modem choices are available at this point. The device is not able to determine the location directly using a WiFi connection, so if the connection is WiFi, the GPS is used to determine the location. In 414, it is determined whether the GPS has sufficient accuracy. In some embodiments, the GPS having sufficient accuracy comprises receiving a signal from a minimum number of satellites (e.g., four GPS satellites). If it is determined that the GPS has sufficient accuracy, control passes to 416. In various embodiments, accuracy comprises one or more of the following: a horizontal estimate of accuracy, a signal strength, a number of satellites, a vertical estimate of accuracy, a geometric dilution of precision (e.g., horizontal, vertical, etc.), or any other appropriate accuracy indicator. In 416, the GPS bounding box location is determined. In some embodiments, the GPS bounding box comprises the region the GPS has confidence that it is within. The GPS bounding box comprises a location associated with the device. If it is determined in 414 that the GPS does not have sufficient signal strength, control passes to 418. In 418, it has been established that all methods for determining the location associated with the device has failed, so the location is indicated as not determined. In some embodiments, the location is determined after registering with a server. In some embodiments, the process repeats if the process fails.

Figure 5:
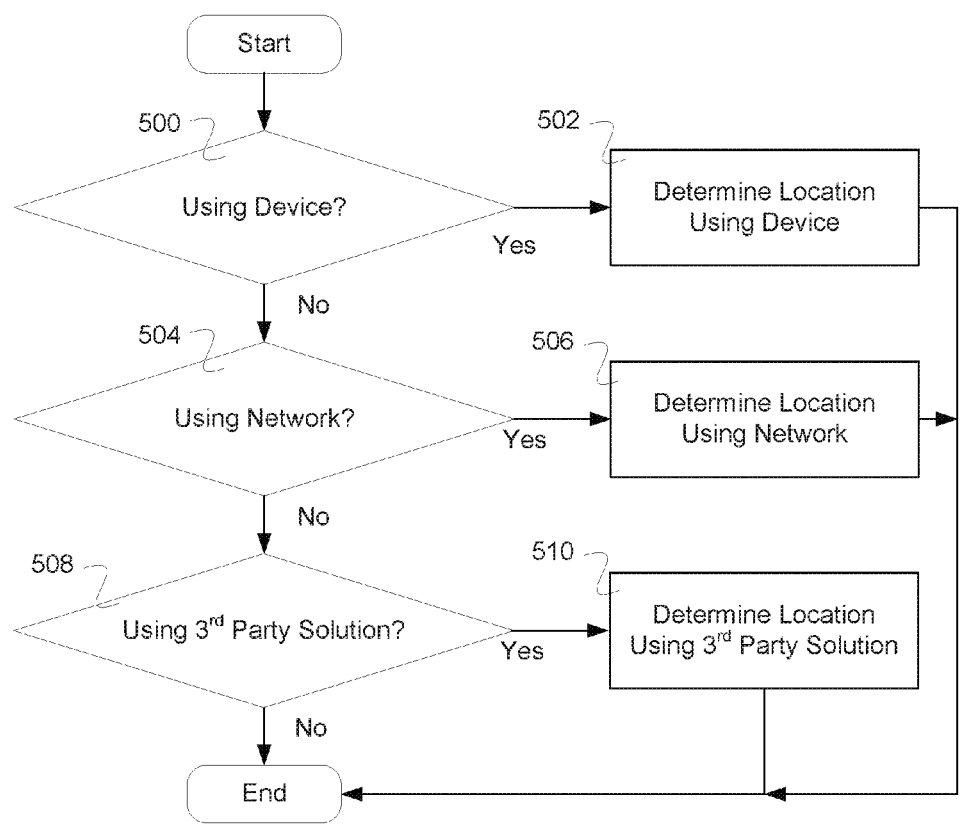
FIG. 5 is a flow diagram illustrating an embodiment of a process for determining location.

FIG. 5 is a flow diagram illustrating an embodiment of a process for determining location. In some embodiments, the process of FIG. 5 is used to implement 300 of FIG. 3. In the example shown, in 500 it is determined whether to use a device. In the event that it is determined to use the device, in 502 the location is determined using the device. For example, the device (e.g., interface or modem type) or stored information is used to determine a location. In various embodiments, location is determined for the device using a stored mobile country code (MCC) or identifier information of a SIM (e.g., for GSM, iDEN, UMTS, LTE, etc.), an embedded SIM (e.g., M2M), a R-UIM (e.g., CDMA), or any other appropriate identifier module. In various embodiments, a module comprises hardware or code (e.g., embedded firmware). The stored device information or the device type is indicative of the final location (e.g., a home location) for the device. In some embodiments, a mobile device can have multiple identifiers and/or multiple hardware pieces that are associated with location(s). For this case, the map data for the union of those location(s) is kept and not deleted. In various embodiments, the location is determined using a device type—for example, a CDMA device type indicates a North American location, a GSM device indicates a European location.

In the event that it is determine to not use the device, in 504 it is determined whether to use a network. In the event that it is determined to use the network, in 506 the location is determined using the network. For example, the location is determined by listening to the network broadcast and receiving an indication (e.g., a country code, an identifier associated with a country, a cell tower location, etc.) of the location of the device. In various embodiments, the network types include GSM, CDMA, iDEN, UMTS, LTE, WiMax, or any other appropriate network type. The network location determined is indicative of the location when the device is turned on—not necessarily of the final location or a device home location.

In the event that it is determined to not use the network, in 508 it is determined whether to use a $3^{rd}$ party solution. In the event that it is determined to use a $3^{rd}$ party solution, in 510 a location is determined to use the $3^{rd}$ party solution. For example, a $3^{rd}$ party location solution on the mobile device. In various embodiments, the $3^{rd}$ party location solution comprises a GPS location determination, a WiFi location determination (e.g., a hotspot location), a television broadcast signal location determination, an internet protocol address based location, a cellular tower location, or any other appropriate third party location. In some embodiments, determining a location comprises determining abounding box.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for deleting map data, comprising:
    a memory configured to store a baseline set of map data, wherein the baseline set of map data includes a same set of a plurality of map bundles for all systems; and
    a processor configured to:
        responsive to initialization of the system, determine a location associated with a device, wherein the location is determined based at least in part on directly querying a modem to determine a type of modem and the device stores a plurality of map bundles in a local memory of the device;
        select at least one of the plurality of map bundles to delete-based at least in part on the determined location, wherein the at least one of the plurality of map bundles to delete includes those map bundles not associated with the determined location; and
        delete the selected at least one of the plurality of map bundles from the baseline set of map data in the local memory of the device.

2. The system of claim 1, wherein determining the location comprises determining the location using the device.

3. The system of claim 2, wherein determining the location using the device comprises determining a device type.

4. The system of claim 2, wherein determining the location using the device comprises determining a stored information.

5. The system of claim 4, wherein the stored information comprises one or more of the following: a mobile country code or identifier for a SIM, an embedded SIM, or a R-UIM.

6. The system of claim 1, wherein determining the location comprises determining the location using a network.

7. The system of claim 6, wherein determining the location using the device comprises listening to a network broadcast and receiving an indication of the location of the device.

8. The system of claim 1, wherein determining the location comprises determining the location using a $3^{rd}$ party solution.

9. The system of claim 8, wherein determining the location using the $3^{rd}$ party solution comprises one of the following: a WiFi location determination, a television broadcast signal location determination, an internet protocol address based location, or a cellular tower location.

10. The system of claim 8, wherein determining the location using the $3^{rd}$ party solution comprises a GPS location solution.

11. The system of claim 8, wherein determining the location comprises determining a bounding box.

12. The system of claim 10, wherein the GPS location solution comprises determining whether the GPS location solution has sufficient accuracy.

13. The system of claim 1, wherein a map bundle comprises a set of map data specific to a region.

14. The system of claim 1, wherein a map bundle comprises a data version identifier.

15. The system of claim 14, wherein a data version identifier comprises one or more of the following: vendor identifier, a product identifier, a version identifier, or a region identifier.

16. The system of claim 1, wherein the location is associated with one or more map bundles.

17. The system of claim 16, wherein the one or more map bundles to delete comprise map bundles not associated with the location.

18. The system of claim 1, further comprising determining whether an update is required.

19. The system of claim 18, wherein, in the event that an update is required, the map bundles remaining on the device are determined.

20. The system of claim 18, wherein, in the event that an update is required, the map bundles remaining on the device are updated.

21. The system of claim 1, wherein a memory space that previously stored the one or more map bundles is freed for other use or for general use.

22. A method for deleting map data, comprising:
    receiving a baseline set of map data, wherein the baseline set of map data includes a same set of a plurality of map bundles for all device;
    responsive to initialization of a device, determining, using a processor, a location associated with the device, wherein the location is determined based at least in part on directly querying a modem to determine a type of modem and the device stores a plurality of map bundles in a local memory of the device;
    selecting at least one of the plurality of map bundles to delete based at least in part on the determined location, wherein the at least one of the plurality of map bundles to delete includes those map bundles not associated with the determined location; and
    deleting the selected at least one of the plurality of map bundles from the baseline set of map data in the local memory of the device.

23. A computer program product for deleting map data, the computer program product being embodied in a non-transitory computer readable storage medium and comprising computer instructions for:
    receiving a baseline set of map data, wherein the baseline set of map data includes a same set of a plurality of map bundles for all devices;
    responsive to initialization of a device, determining, using a processor, a location associated with the device, wherein the location is determined based at least in part on directly querying a modem to determine a type of modem and the device stores a plurality of map bundles in a local memory of the device;
    selecting at least one of the plurality of map bundles to delete based at least in part on the determined location, wherein the at least one of the plurality of map bundles to delete includes those map bundles not associated with the determined location; and
    deleting the selected at least one of the plurality of map bundles from the baseline set of map data in the local memory of the device.

24. The method of claim 22, further comprising determining whether the initialization of the device is valid, wherein the deleting of the plurality of map bundles is further based on the determination that the initialization of the device is valid.

* * * * *